(12) United States Patent
Chen

(10) Patent No.: US 6,857,231 B2
(45) Date of Patent: Feb. 22, 2005

(54) PROPELLER-CONTROLLED ACTIVE TUNED-LIQUID-COLUMN DAMPER

(76) Inventor: Yung-Hsiang Chen, P.O. Box No. 6-57, Junghe, Taipei 235 (TW)

(*) Notice: Subject to any disclaimer, the term of this patent is extended or adjusted under 35 U.S.C. 154(b) by 0 days.

(21) Appl. No.: 10/409,174

(22) Filed: Apr. 9, 2003

(65) Prior Publication Data
US 2004/0201153 A1 Oct. 14, 2004

(51) Int. Cl.[7] .............................................. E04H 9/02
(52) U.S. Cl. ....................... 52/167.2; 52/167.1; 188/378
(58) Field of Search ........................... 267/140.15, 136; 188/378, 379, 380, 266; 52/167.2, 167.1; 114/125

(56) References Cited

U.S. PATENT DOCUMENTS

| | | | | |
|---|---|---|---|---|
| 3,606,851 A | * | 9/1971 | Pangalila et al. | 114/125 |
| 4,783,937 A | * | 11/1988 | Sato | 52/168 |
| 4,922,671 A | * | 5/1990 | Sato | 52/167.2 |
| 5,070,663 A | * | 12/1991 | Sakai et al. | 52/167.1 |
| 5,542,220 A | * | 8/1996 | Yoshimura et al. | 52/167.1 |
| 5,560,161 A | * | 10/1996 | Lou | 52/167.2 |

FOREIGN PATENT DOCUMENTS

| | | | | |
|---|---|---|---|---|
| JP | 3-63364 A | * | 3/1991 | 52/167.2 |
| JP | 6-50838 A | * | 2/1994 | 73/579 |

* cited by examiner

Primary Examiner—Matthew C. Graham
Assistant Examiner—Mariano Sy
(74) Attorney, Agent, or Firm—Troxell Law Office PLLC

(57) ABSTRACT

A propeller controlled active tuned-liquid-column damper (TLCD), which can control and suppress the vibration thereof, such as building, tower, bridge, vehicle, ship, offshore platform, facilities, and instrument, etc. This invention is composed of a passive TLCD, one or more propellers, a gear-shaft unit, a servo-motor, and a computer-control system. One or more propellers are installed in a line along the gear-shaft unit inside the horizontal section of the U-shape vessel, the propellers are driven by a servo-motor controlled by the computer-control system which start the servo-motor to drive the propellers immediately. Both fluid (or water) acceleration and the propellers' thrust can yield the resistance force to increase the vibration-control ability significantly. The natural period of an open TLCD can be adjusted by only changing the wetted length, whereas a closed TLCD can be adjusted by changing the wetted length, air pressure and air volume in the air chamber.

6 Claims, 2 Drawing Sheets

PROPELLER-CONTROLLED ACTIVE TUNED-LIQUID-COLUMN DAMPER

BACKGROUND OF THE PRESENT INVENTION a) Field of the Invention

The present invention relates to a propeller-controlled active tuned-liquid-column damper which can be used to control and suppress the vibration of a structure subjected to earthquake, gust, machine operation, water waves, or other kind of excitation very efficiently. This invention can be applied to the following structures as building, tower, bridge, ship, offshore platform, vehicle, facilities, and instrument, etc., particularly for the flexible structures such as the high-rise building and the long-span bridge.

b) Description of the Prior Art

There are many conventional technologies or devices regarding the vibrational control of a structure, such as the Tuned Mass Damper (or TMD), the Tuned Liquid Damper (or TLD), and the Tuned Liquid-Column Damper (or TLCD), etc. as follows.

1. Tuned Mass Damper (or TMD)

A plane frame with a TMD is shown in FIG. 1. This plane frame is composed of a beam (1) and two columns (2). The TMD is used to reduce the vibration of the frame subjected to any excitation coming from the machine operation, gust, or earthquake, etc. The TMD is composed of a mass block (3), a spring (4), a dashpot (5), and several rollers (6). The weight of the mass block (3) of the TMD is about 0.5~2.0% of the total weight of the plane frame. The motion of the mass block (3) due to the resonance with the structure can provide an inertia force opposite to the direction of the vibration of this structure and can reduce the vibration of this structure efficiently.

The natural period of the TMD can be adjusted by changing the mass of the mass block (3) and stiffness of the spring (4). The TMD has the optimal performance in vibrational control, if the natural period and damping ratio of this TMD are equal to the corresponding tuned period and the optimal damping ratio, respectively. Usually the tuned period is very close to the fundamental period of the structure whose vibration is required to be controlled.

The practical application of TMD is somewhat restricted and limited, this is due to the fact that the mass of TMD is heavy, the mechanism of the spring (4) and dashpot (5) system is complicated and not easy to maintain, it needs large space for TMD and its motion, it needs large power to control the motion of the mass block (3) if an active-control technique is applied, and the structure of the active control system of TMD is also complicated and not easy to maintain. Therefore TMD is not quite popular in practice, particularly for the large structures like a high-rise building.

2. Tuned Liquid Damper (or TLD)

A plane frame with a TLD is shown in FIG. 2. The structure of a TLD is quite simple, it is a liquid tank (7) partially filled with liquid (or water) (8). An appropriately designed water-storing tank on the roof of a high-rise building can serve as a TLD. The liquid weight of TLD is about 0.5~2.0% of the total weight of a structure which is under vibrational control. The fluid sloshing and oscillation inside the fluid tank (7) due to resonance can provide the force opposite to the direction of the vibration of the structure and can reduce the vibration efficiently.

The fundamental period of TLD can be adjusted by changing the shape and the dimensions (including the water depth) of the fluid tank (7). The TLD has the optimal performance in vibrational control, if the fundamental period and the damping ratio of this TLD are equal to the corresponding tuned period and the optimal damping ratio, respectively. Usually the tuned period is very close to the fundamental period of the structure under vibrational control.

Although the structure of TLD is simple i.e. a fluid tank (7) and its inside fluid (8), the practical application of TLD is still very limited, particularly for the high-rise building. This is due to the fact that the tuned period of TMD is not easy to be achieved, the mechanism to achieve the optimal damping ratio of a TLD is complicated and not easy to be designed. Furthermore the active-control technique is not easy to be applied to TLD so far, all the practical applications of TLD is only limited to the passive TLD, the active TLD is still not practical and it needs more efforts of future research.

3. Tuned Liquid-Column Damper (or TLCD)

A plane frame with a TLCD is shown in FIG. 3. The structure of a TLCD is also quite simple, it is a long U-shape vessel (9) partially filled with fluid (or water) (8). The U-shape vessel (9) is a long circular or rectangular tube as shown in FIGS. 4 and 5. The length of the tube should be at least ten times greater than the diameter or the in-plane dimension of the cross section. The cross section of a TLCD can either uniform or non-uniform, but it is usually symmetrical about the vertical center line of a TLCD. The ends of the vertical columns of a TLCD are usually open. The fluid weight of a TLCD is also about 0.5~2.0% of the total weight of a structure under vibrational control.

The fluid flow and oscillation inside the U-shape vessel (9) due to resonance can provide a force opposite to the direction of the vibration and can reduce the vibration of the structure effectively. The natural period of a TLCD can be adjusted by changing the wetted length of the U-shape vessel (i.e. the sum of the length of the horizontal section and the water heads of the vertical columns). The TLCD has the optimal performance in vibrational control, if the natural period and the damping ratio of this TLCD are equal to the corresponding tuned period and the optimal damping ratio, respectively. Usually the tuned period is very close to the fundamental period of the structure under vibration control. In general the damping ratio of a TLCD is small than the optimal damping ratio in practice; therefore the properly-designed artificial orifices, which are made of the buffers (10), installed inside the horizontal section of a TLCD are necessary to achieve the optimal damping ratio. The damping ratio of a TLCD with orifices is strongly dependent of the shape, size, and number of the orifices, and it can be predicted by the test and engineering experience or judgment.

The natural period of an open TLCD can be adjusted by only changing the wetted length; therefore the tuned period for a TLCD is not easy to be achieved and usually we need a great number of TLCD's in practice. This is why the practical application of TLCD is still quite limited, particularly for the high-rise buildings. The air-compressor control system can accelerate the fluid flow to increase the vibrational-control ability of a TLCD, but the structure of the air-compressor control system including the air valves is complicated and not easy to maintain.

SUMMARY OF THE PRESENT INVENTION

This invention is to provide the structure of the so-called "Propeller Controlled Active Tuned-Liquid-Column Damper (TLCD)," which can control and suppress the vibration of a structure such as building, tower, bridge, vehicle, ship, offshore platform, facilities, and instrument, etc., very efficiently. This invention is composed of a passive TLCD (it is a U-shape vessel with partially-filled fluid or water), one or more propellers, a gear-shaft unit, a servo-motor, and a computer-control system. One or more propellers are installed in a line along the gear-shaft unit inside the horizontal section of the U-shape vessel, the propellers are driven by a servo-motor controlled by the computer-control system.

This invention can be functioned as either a passive or an active TLCD. It is a passive TLCD when the vibration of a structure is less than a specific limit, both the servo-motor and the propellers remain still. It will become an active TLCD when the vibration of a structure is higher than a specific limit, the computer-control will start the servo-motor to drive the propellers immediately. Both the fluid (or water) acceleration and the propellers' thrust can yield the resistance force to increase the vibration-control ability of this invention significantly, thus the vibration of a structure can be controlled below a desired limit.

The ends of the vertical columns of the U-shape vessel can be both open and closed, and the TLCD is called as a open or closed TLCD. The natural period of an open TLCD can be adjusted by only changing the wetted length, but for a closed TLCD it can be adjusted by changing the wetted length, air pressure and air volume in the air chamber. Therefore the propeller-controlled active closed TLCD is more flexible in practice and more efficient in vibrational control.

The efficiency of the propellers is very high when they operate in the restricted water inside the U-shape vessel (or tube), thus the propellers and thrust can provide a great contribution to the vibration control. The size (or weight) of TLCD of this invention can be reduced as compared with the conventional TMD, TLD, or TLCD. The weight of the fluid (or water) of TLCD of this invention is about 0.1~2.0% of the total weight of the structure under vibrational control. Therefore the present invention can be applied to any-size structure, either large or small, such as building, tower, bridge, ship, offshore platform, vehicle, facilities, and instrument, etc. subjected to earthquake, gust, machine operation, water waves, or any other excitation.

The U-shape vessel is essentially a long tube, the flow motion inside the U-shape vessel can be characterized as a single-degree-of-freedom system which can be easily included in the structural analysis and computation of a large structural system by use of the finite-element method, this can make this invention very practical in applications.

In view of the important features as previously described the present invention has the following advantages as: simple structure; easy manufacture, installation, and maintenance; no need to change the structural system of a structure under vibrational control; space saving; wide applications and excellent performance. Therefore this invention is new, innovative, improved, economic, and practical in application.

DESCRIPTION OF THE PREFERRED EMBODIMENT

Figure 1:
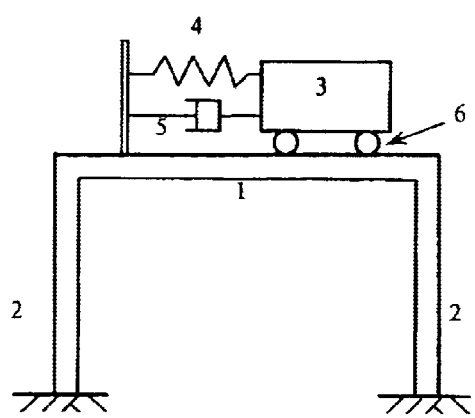
FIG. 1 shows a plane-frame structure with a tuned-mass damper.
Figure 2:
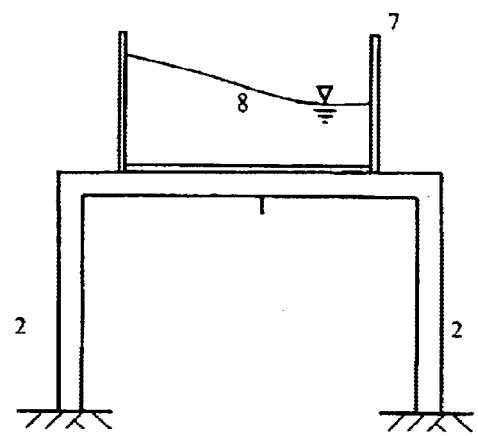
FIG. 2 shows a plane-frame structure with a tuned-liquid damper.
Figure 3:
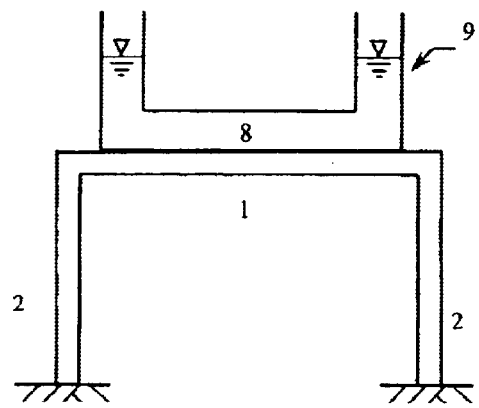
FIG. 3 shows a plane-frame structure with a tuned-liquid-column damper.
Figure 4:
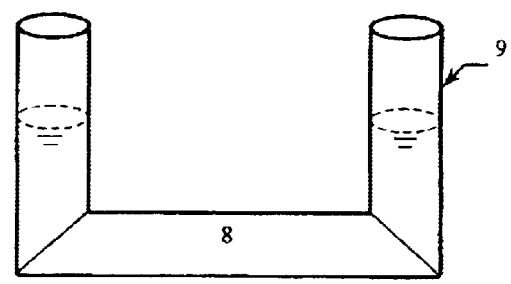
FIG. 4 shows a U-shape vessel (or tube) of circular cross-section.
Figure 5:
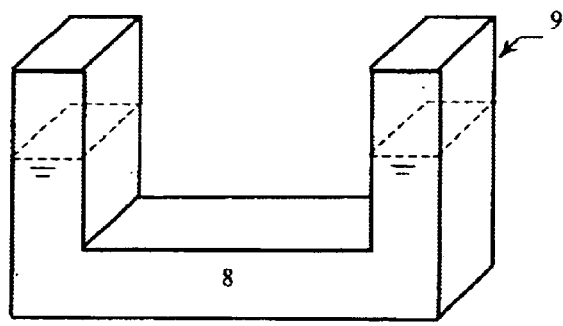
FIG. 5 shows a U-shape vessel (or tube) of rectangular cross-section.
Figure 6:
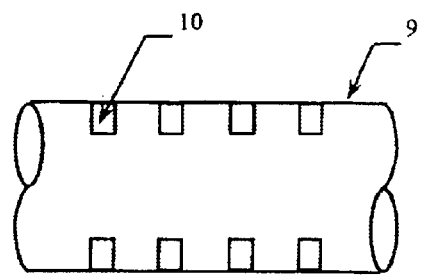
FIG. 6 shows the artificial orifices, which are made of the buffers, installed inside the horizontal section of a TLCD.
Figure 7:
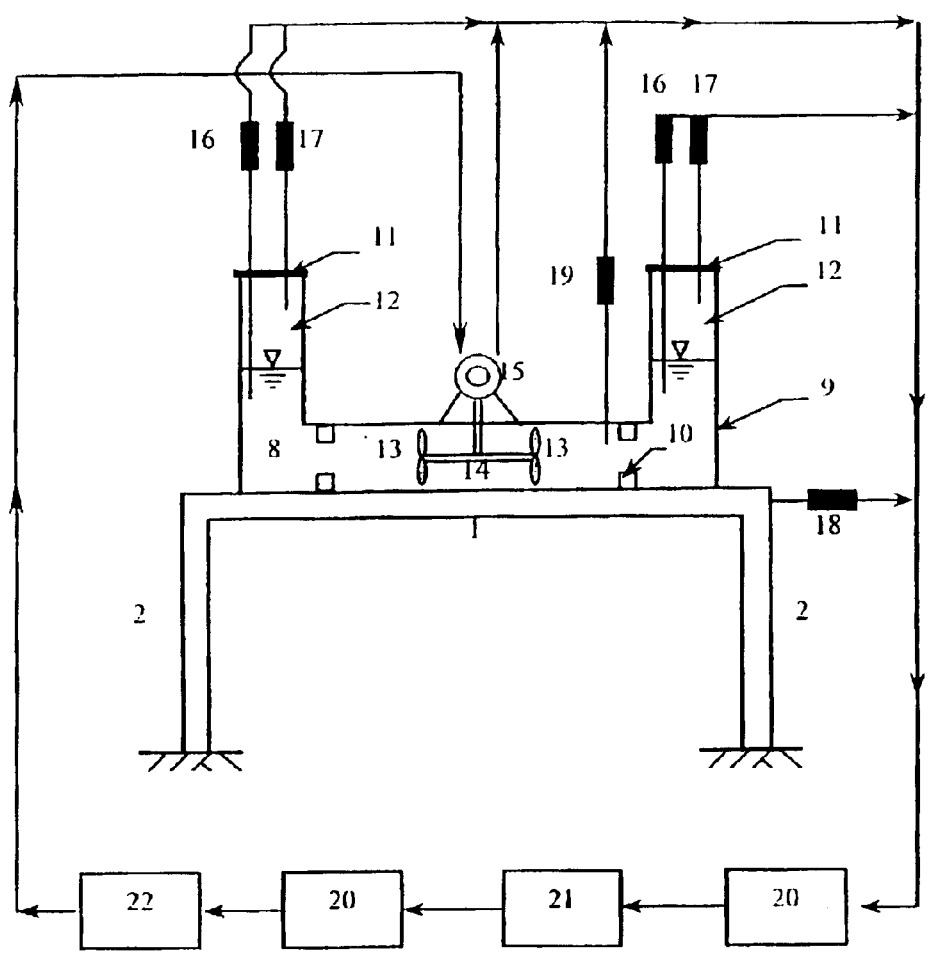
FIG. 7 shows a plane-frame structure with the present invention (the propeller-controlled active tuned-liquid-column damper).

A plane frame with a propeller-controlled ATLCD is shown in FIG. 7. This invention consists of a passive TLCD (8 and 9), one or more propellers (13), a gear-shaft unit (14), a servo-motor (15), and a computer-control system (16~22). One or more propellers (13) are installed in a line along a gear-shaft unit (14) inside the horizontal section of the U-shape vessel (9), these propellers (13) are driven by a servo-motor (15) controlled by the computer-control system (16~22). Even number (usually two) propellers are installed symmetrically near the center of the horizontal section of the U-shape vessel (9) in order to have more uniform and symmetrical fluid flow. The U-shape vessel (9) is a long circular or rectangular tube, its cross-section area and shape can be uniform or non-uniform, but they should be uniform and circular around and nearby the propellers.

The ends of the vertical columns of the U-shape vessel (9) can be both open or closed, the former one is called as the open TLCD and the latter the closed TLCD, respectively. If the each end of the vertical column is closed by an air-tight cover (11), the air pressure in the air chamber (12) between the fluid surface and the air-tight cover can be pre-adjusted, and this is very important for the design of a closed TLCD. The natural period of the open TLCD can be adjusted by only changing the wetted length of the U-shape vessel (9), whereas for a closed TLCD it can be adjusted by changing the wetted length of the U-shape vessel (9), and the air pressure and volume of the air chamber (12). Therefore the closed TLCD is more flexible in design than the open one. The open or closed TLCD has the optimal performance in vibrational control, if its natural period and damping are equal to the corresponding tuned period and the optimal damping ratio, respectively. Usually the tuned period is very closed to the fundamental period of the structure under vibrational control.

If the passive TLCD, either open or closed, is equipped with one or more (usually two) propellers (13) in a line along a gear-shaft unit (14) inside and at the center of this TLCD, and these propellers (13) are driven simultaneously by a servo-motor (15) controlled by a computer-control system (16~22), this passive TLCD then become an active one named as "Propeller-Controlled ATLCD." This invention is a new, innovative, and improved device of vibration control which has the characteristics, functions and advantages of both a passive and active TLCDs.

The important feature of the U-shape vessel (9) is that it is a long tube, the diameter or the in-plane dimension of the vertical column is very small compared with the length of the horizontal section of the U-shape vessel; therefore the fluid movement inside the U-shape vessel (9) can be assumed as one-dimensional incompressible fluid flow, and the fluid surface inside the vertical columns can be assumed almost flat during moving vertically. Under the previous statements the fluid motion inside the U-shape vessel (9) can be characterized as a single degree of freedom system, which can be very easily included in the structural analysis and computation of a large structural system under vibrational control by use of the finite-element method.

Also as shown in FIG. 7 is the computer-control system (16~22) of this invention which includes wave gauge (16), air-pressure gauge (17), displacement gauge (or accelerometer) (18), venturi meter (19), signal card (20), computer (21), and motor-control card (22). The water elevation, air pressure, structural vibration, fluid-flow velocity are all detected by wave probe (16), air-pressure gauge (17), displacement gauge (or accelerometer) (18), and venturi meter (19), respectively. All the detected analog signals go through the signal card (20) to obtain the digital-signal, then go to the computer (21) for data analysis, the computer then sends the digital-signal data to signal card (20), then the analog signal go to the control card (22) to start the servo-motor (15) to drive the propellers (13) immediately, if the vibration of structure is above a certain level. At the same time the r.p.m and the power of the servo-motor (15), and the r.p.m and the thrust of each propeller (13) are all detected and recorded. When the vibration of the structure is below a certain level, both the servo-motor (15) and the propellers (13) keep still at this situation, this invention serves as a passive TLCD which can also reduce the vibration of the structure efficiently; when the vibration is above a certain level, this invention serves as an active TLCD, both the flow acceleration and the propeller's thrust can increase the vibration-control ability significantly and keep the vibration of the structural below a desired limit. The propeller's thrust can provide a great contribution to the vibrational control; therefore the size (or weight) of TLCD can be reduced, this is an additional and powerful advantage of this invention. The efficiency of the propeller (13) is very high when it operates in the restricted water (8) inside the long tube (9) of TLCD; the sensitivity of the computer-controlled servo-motor (15) is very high; the manufacture and installation of the U-shape vessel is simple; the U-shape vessel (9) is space saving; and there is no need to change the structural system of a structure under vibrational control, all these can make this invention to have the significant advantages as follows: simple structure, easy installation and maintenance, economy, and excellent performance in vibrational control. Therefore this invention is new, innovative, improved, economic, and practical in applications.

What is claimed is:

1. A propeller-controlled active tuned-liquid-column damper comprising:
    a) a U-shaped vessel having a horizontal portion and two vertical portions protruding upwardly from opposing ends of the horizontal portion, the U-shaped vessel containing a fluid;
    b) a servo-motor;
    c) at least one propeller located in the horizontal portion of the U-shaped vessel;
    d) a gear-shaft unit connected to the servo-motor and the at least one propeller; and
    e) a computer control system measuring a structural vibration and controlling the servo-motor and the at least one propeller, wherein, when the structural vibration is below a predetermined level, the computer control system stops the servo-motor and the at least one propeller is held in a stationary position, and, when the structural vibration is above a predetermined level, the computer control system starts the servo-motor and the at least one propeller is rotated.

2. The propeller-controlled active tuned-liquid-column damper according to claim 1, wherein each of the two vertical portions of the U-shaped vessel has an open end.

3. The propeller-controlled active tuned-liquid-column damper according to claim 1, wherein each of the two vertical portions of the U-shaped vessel has a closed end.

4. The propeller-controlled active tuned-liquid-column damper according to claim 1, wherein an outer diameter of the at least one propeller is less than an interior diameter of the horizontal portion of the U-shaped vessel adjacent to the at least one propeller.

5. The propeller-controlled active tuned-liquid-column damper according to claim 1, wherein the at least one propeller includes an even number of propellers.

6. The propeller-controlled active tuned-liquid-column damper according to claim 1, wherein the computer control system includes a wave gauge, an air pressure gauge, a displacement gauge, a venturi meter, a signal card, a computer, and a motor control card.

* * * * *